United States Patent
Fernandez, Sr.

(10) Patent No.: US 9,611,603 B2
(45) Date of Patent: Apr. 4, 2017

(54) CONVERTIBLE TOOL

(71) Applicant: Don Fernandez, Sr., Cortlandt Manor, NY (US)

(72) Inventor: Don Fernandez, Sr., Cortlandt Manor, NY (US)

(*) Notice: Subject to any disclaimer, the term of this patent is extended or adjusted under 35 U.S.C. 154(b) by 0 days.

(21) Appl. No.: 14/618,325

(22) Filed: Feb. 10, 2015

(65) Prior Publication Data
US 2015/0233069 A1 Aug. 20, 2015

Related U.S. Application Data

(60) Provisional application No. 61/938,060, filed on Feb. 10, 2014.

(51) Int. Cl.
*E01H 5/02* (2006.01)
*E01H 5/06* (2006.01)
*A01B 1/22* (2006.01)
*A01D 7/00* (2006.01)

(52) U.S. Cl.
CPC ............. *E01H 5/061* (2013.01); *A01B 1/222* (2013.01); *E01H 5/02* (2013.01); *A01D 7/00* (2013.01)

(58) Field of Classification Search
CPC ........... A01B 1/00; A01B 1/026; A01B 1/222; E01H 5/02; E01H 5/061; A01D 7/00
USPC ......... 37/241, 265, 272, 273, 278, 284, 285; 294/53.5, 54.5, 57
See application file for complete search history.

(56) References Cited

U.S. PATENT DOCUMENTS

| | | | | |
|---|---|---|---|---|
| 2,432,780 A | * | 12/1947 | Mader | E01H 5/02 16/235 |
| 3,526,979 A | * | 9/1970 | Ladewski | E01H 5/02 37/273 |
| 4,796,367 A | | 1/1989 | Kulat | |
| 5,133,582 A | * | 7/1992 | Rocha | A01B 1/026 16/426 |
| 5,159,769 A | * | 11/1992 | Odorisio | E01H 5/02 294/54.5 |
| 5,511,328 A | * | 4/1996 | Fingerer | E01H 5/02 294/54.5 |
| 5,791,072 A | | 8/1998 | Schbot | |
| 5,810,408 A | * | 9/1998 | Armstrong | A01B 1/00 16/422 |
| 6,269,558 B1 | | 8/2001 | Alexander | |
| 6,290,273 B1 | * | 9/2001 | Moisan | E01H 5/02 294/53.5 |
| 7,305,779 B1 | * | 12/2007 | Purvis | E01H 5/02 294/54.5 |

(Continued)

*Primary Examiner* — Robert Pezzuto
(74) *Attorney, Agent, or Firm* — Hedman & Costigan, P.C.; James V. Costigan; Kathleen A. Costigan

(57) ABSTRACT

A tool with a handle having a main shaft extending from the handle that is angled to form a secondary shaft having a second end wherein the angle between the main shaft and the secondary shaft is such that when a person grips the handle the secondary shaft forms an angle with a ground surface that is substantially a right angle. The secondary shaft is adapted to mount a second shaft which may have either a two piece blade that is articulated on the secondary shaft with moveable attachments to form either a flat blade for pushing snow or a V-shaped blade for pushing through snow, where in either configuration, the snow blade is substantially completely in contact with the ground surface or a rake for moving outdoor debris.

8 Claims, 10 Drawing Sheets

(56) References Cited

U.S. PATENT DOCUMENTS

| | | |
|---|---|---|
| 7,437,839 B2 | 10/2008 | Christy |
| 2005/0268498 A1 | 12/2005 | Fortino |
| 2007/0028487 A1 | 2/2007 | Larson |
| 2011/0214316 A1 | 9/2011 | Gomez |
| 2011/0258889 A1 | 10/2011 | Settembre |

* cited by examiner

CONVERTIBLE TOOL

CROSS-REFERENCE TO RELATED APPLICATIONS

This application claims the benefit of Ser. No. 61/938,060, filed Feb. 10, 2014.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

BACKGROUND OF THE INVENTION

1) Field of the Invention

This invention relates to a snow removal tool which may be used as a straight blade pushing shovel or it may be used as a V-shaped snow plow type of pushing shovel.

2) Description of related art

U.S. 2011/0258889 A1 discloses a snow removal device comprising a blade with top and bottom working edges where the blade may be straight, curved or V-shaped. The handle is attached to the center point of the blade with regard to the spacing between the top to the bottom and the side to side of the blade with removable pins.

U.S. Pat. No. 6,269,558 B1 discloses an adjustable snow plow shovel including a T-handle attached to a center point of the blade with regard to the spacing between the top to the bottom and the side to side of the blade. The angle of the blade to the T-shaped handle is adjusted by detaching and reattaching bolts and wing nuts.

U.S. 2007/0028487 A1 discloses a snow shovel apparatus that is designed to remove compacted snow from under a vehicle. The shovel is positioned under the vehicle with the blades closed and before the shovel is withdrawn, the blades are opened by a telescoping mechanism in order to grip and withdraw snow that is under the vehicle.

U.S. Pat. No. 5,791,072 A discloses a snow plow with an adjustable handle that is attached to a bar that is spaced away from the point where the blades are adjustably joined and functions to position the blades in a snow plow position. The handle of this shovel is attached to a height mechanism that allows the angle of the blades to be varied.

U.S. 2011/0214315 A1 discloses a contoured V-shaped snow shovel that is not adjustable and requires a narrow apex that is adapted to cut through heavy snow.

U.S. 2005/0268498 A1 discloses a hand operated snow removal device having a V-shaped plough rigidly joined at the apex or made as a on-piece construction.

U.S. Pat. No. 4,796,367 A discloses an adjustable manual snowplow where the handle is positioned forward of the angled blades so that an operator may drag the snow plow by walking in front of the snow plow.

SUMMARY OF THE INVENTION

The invention preferably comprises a tool comprising a shaft which can be detachably mounted an operating elements such as a snow plow or other outdoor maintenance tool such as a rake. The tool element may be mounted on a handle that has a first end for attachment of a hand gripping means wherein said handle has a main shaft extending from said handle and said main shaft is attached to a secondary shaft having a second end wherein the angle between the main shaft and the secondary shaft is such that when a person grips said hand gripping means the secondary shaft forms an angle with a ground surface that is substantially a right angle.

A secondary shaft may be adapted to mount a snow plow having a two piece blade that is articulated on the secondary shaft with moveable attachment means to form either a flat blade for pushing snow or a V-shaped blade for pushing through snow, where in either configuration, the snow blade is substantially completely in contact with the ground surface.

It is an object of the invention to provide a tool having a shaft on which an operating element such as a snow plow or a rake may be mounted.

It is an object of the invention to provide an adjustable snow removal operating element that may used as a flat blade snow plow or as V-shaped snow plow.

It is also an object of the invention to provide an adjustable snow removal element that may be manually adjusted, without tools, from a flat blade configuration to a V-shaped blade configuration.

It is also an object of the invention to provide a manually adjustable snow removal element that allows the blade to substantially contact a ground surface when the bade is in a flat blade configuration or in a V-shaped blade configuration.

It is also an object of the invention to provide a removable rake element that is adapted to be mounted on a universal shaft element that accommodates other tools such as a snow plow.

These and other objects and advantages of the invention will be readily apparent in view of the following description and drawings of the above-described invention.

DETAILED DESCRIPTION OF THE INVENTION

Figure 1:
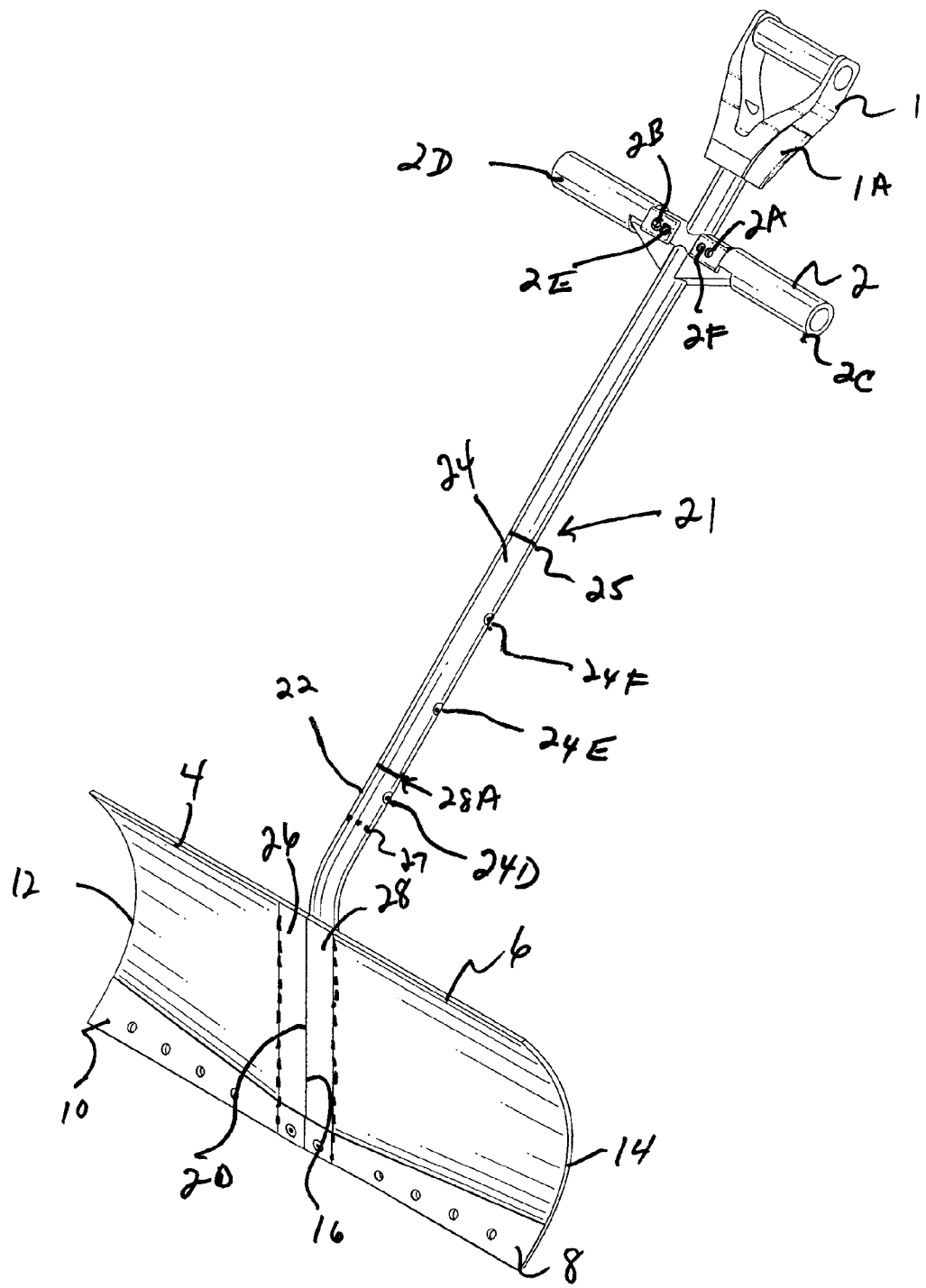
FIG. 1 is a front perspective view of a snow removal tool according to the invention which shows the blade in a flat position.
Figure 2:
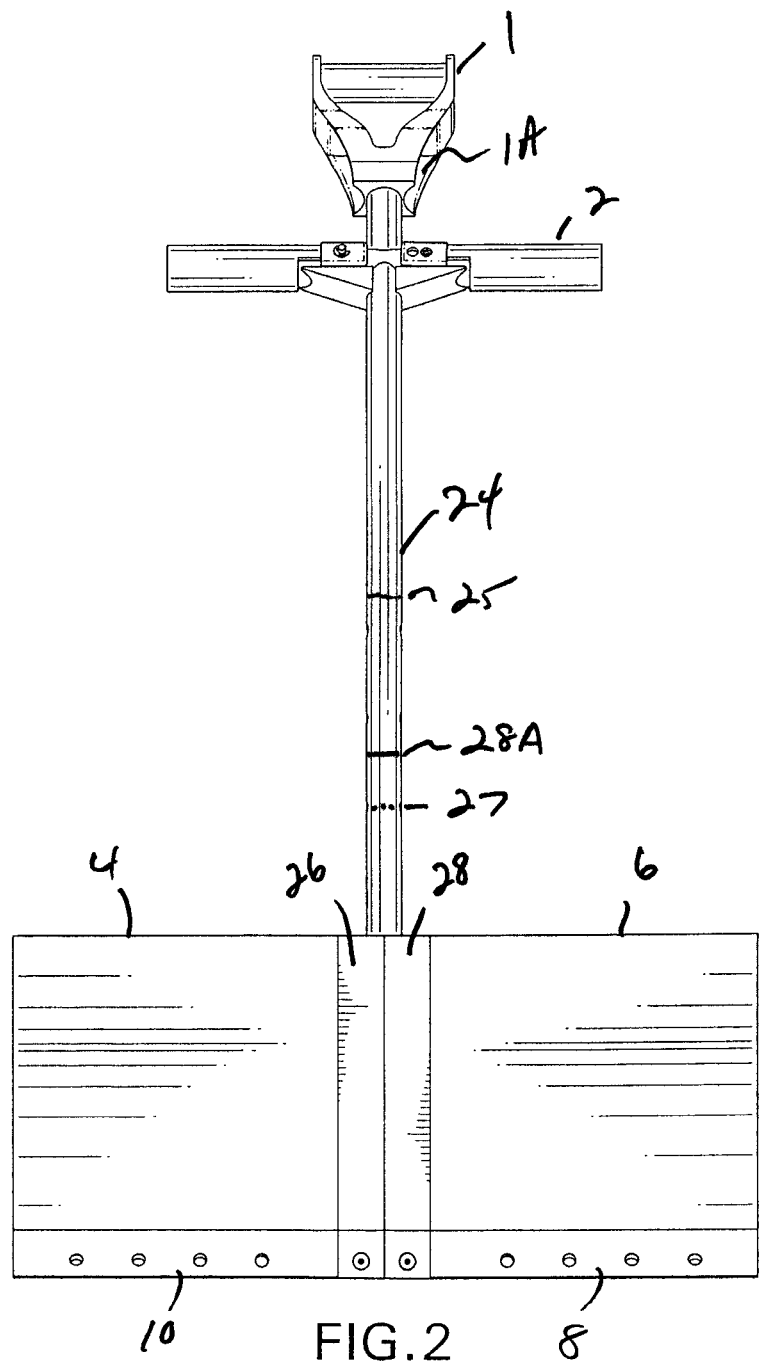
FIG. 2 is a front view of a snow removal tool according to the invention with the bade in a flat position.

A preferred embodiment of the invention is shown in FIG. 1 which has a first hand gripping means 1 and a second hand gripping means 2. The first hand gripping means is adapted to allow for one-hand operation of the snow removal tool using a single cross-bar enclosed grip typically used on digging tools. The second hand gripping means 2 is essentially a T-bar type handle that allows for gripping by two hands in order to maximize the pushing force that can be applied to the blade for moving heavier snow loads. A one hand gripping means and/or a T-type gripping means may be provided on the same handle.

Figure 9:
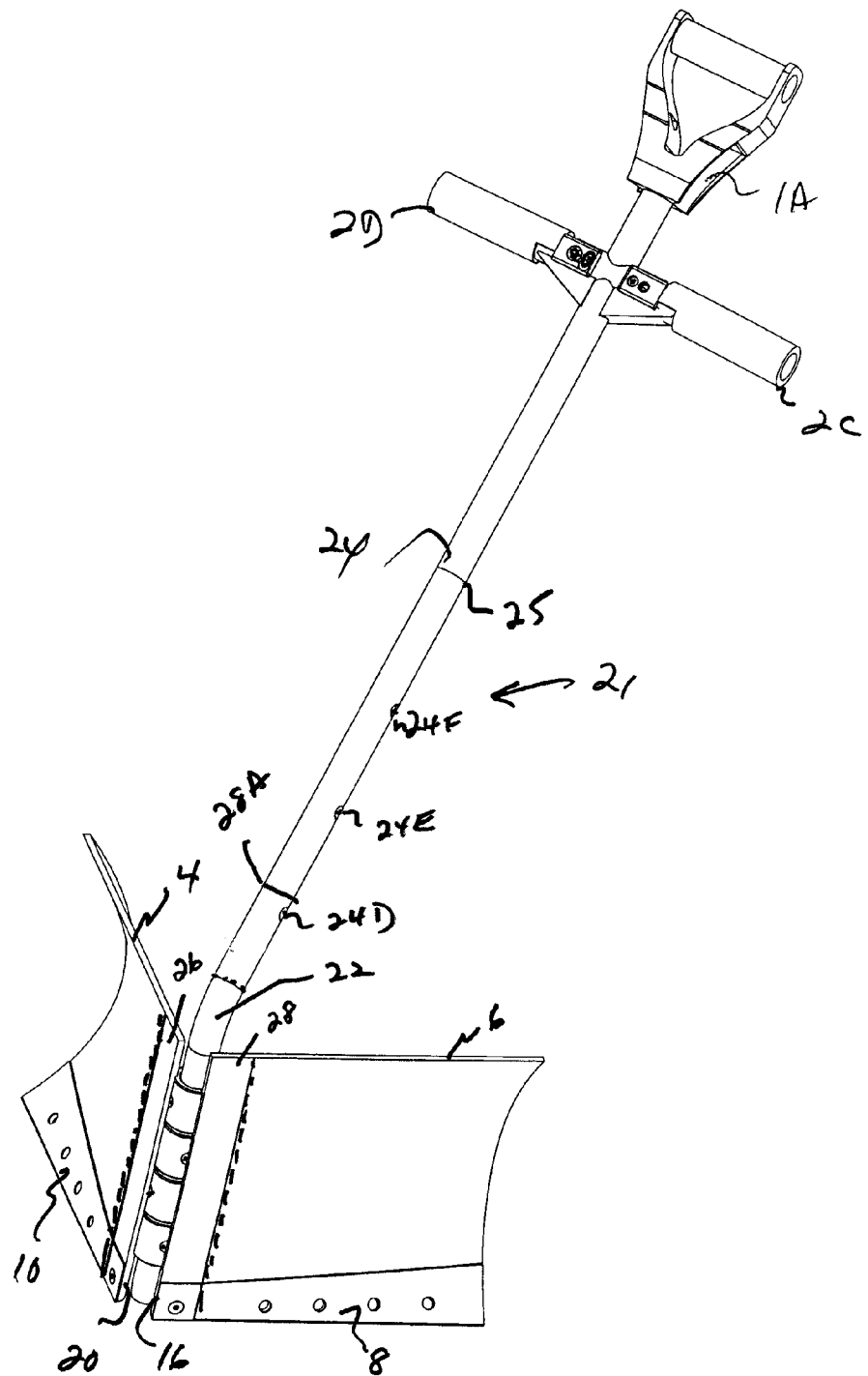
FIG. 9 is a front perspective view of a snow removal tool according to the invention with the blades arranged in a V-shaped configuration.

Blades 4 and 6 are shown in a configuration where they form a flat blade show plow for moving snow. Replaceable blade edges 8 and 10 are shown in an attached position where they contact the ground. Ends 12 and 14 of the blades 4 and 6 are curved while the blades are gradually shaped to form a substantially flat surface at the opposite edges 16, 20 where they are positioned in close proximity to one another and at attached at the rear to the secondary shaft 22 of the handle which is best seen in FIG. 9. Zones 26 and 28, which are bordered on one side by broken lines, identify the end of the blades 4 and 6 where there is a substantially flat surface that terminates at edges 16 and 20.

The T-bar handle 2 may be articulated at joints 2A and 2B to allow for folding side 2C of the T-bar handle into cavity 1A and a corresponding cavity (not shown) on the opposite side of the handle to accommodate side 2D of the T-bar handle 2, when desired. Cavity 1A and the cavity on the opposite side of the T-bar handle are sized so that when the T-shaped handle is positioned in the respective cavities, it will be retained with a snap fit or friction fit. Spring loaded push buttons 2E and 2F are provided to lock and unlock sides 2C and 2D of the t-bar handle 2. The main shaft 24 of the handle 21 is shown in FIG. 1 as being round and substantially straight although in other embodiments it may be curved or shaped with angles to form a square handles or any other desired shape.

Figure 3:
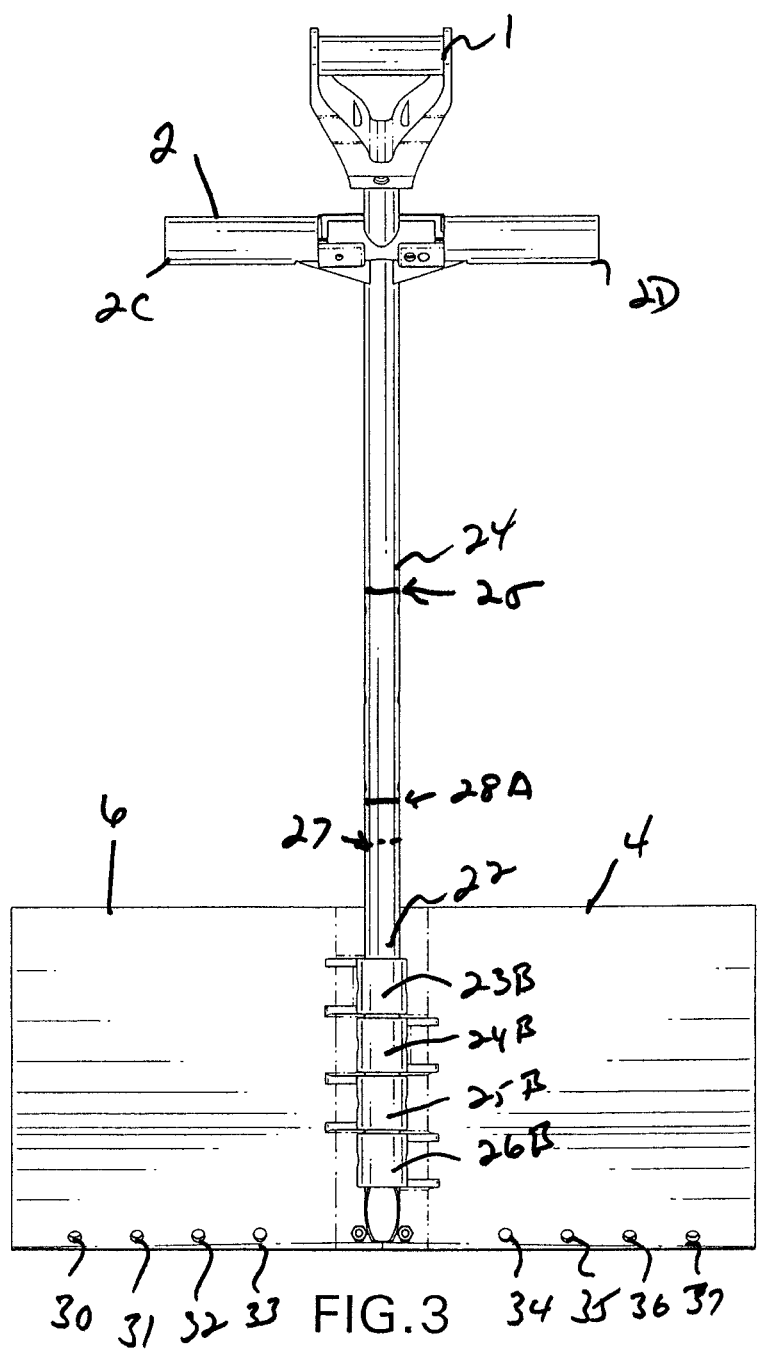
FIG. 3 is a back view of a snow removal tool according to the invention with the blade in a flat position.
Figure 8:
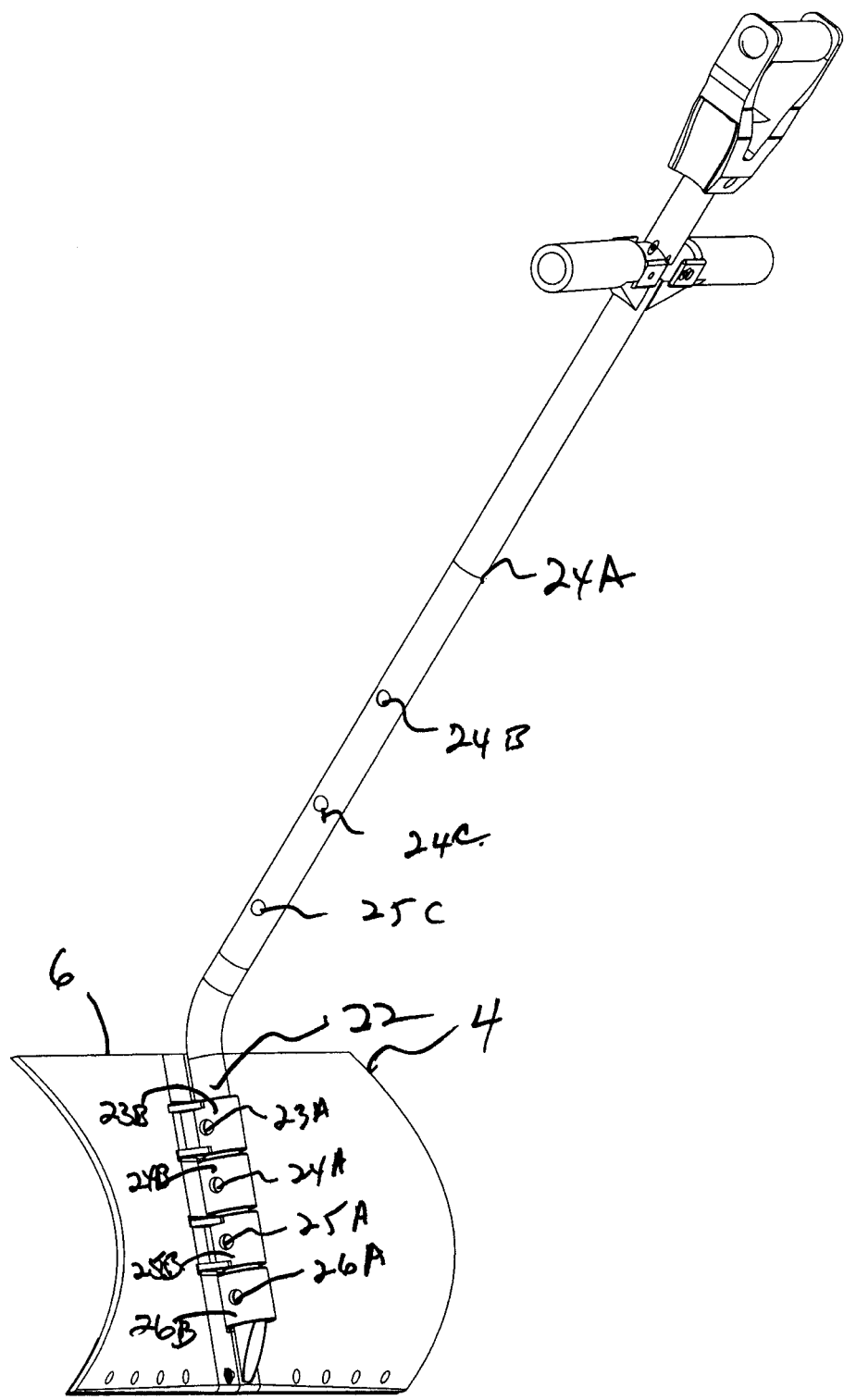
FIG. 8 is a rear perspective view of a snow removal tool according top the invention which shows the annular rings that attach each of the separate blades to the secondary shaft of the handle and the detail of the hand gripping means.

Blades 4 and 6 may optionally be provided with a mounting base for the annular rings which are alternately mounted on the rear of blades 4 and 6 as shown in FIGS. 3, 8 and 9.

Figure 4:
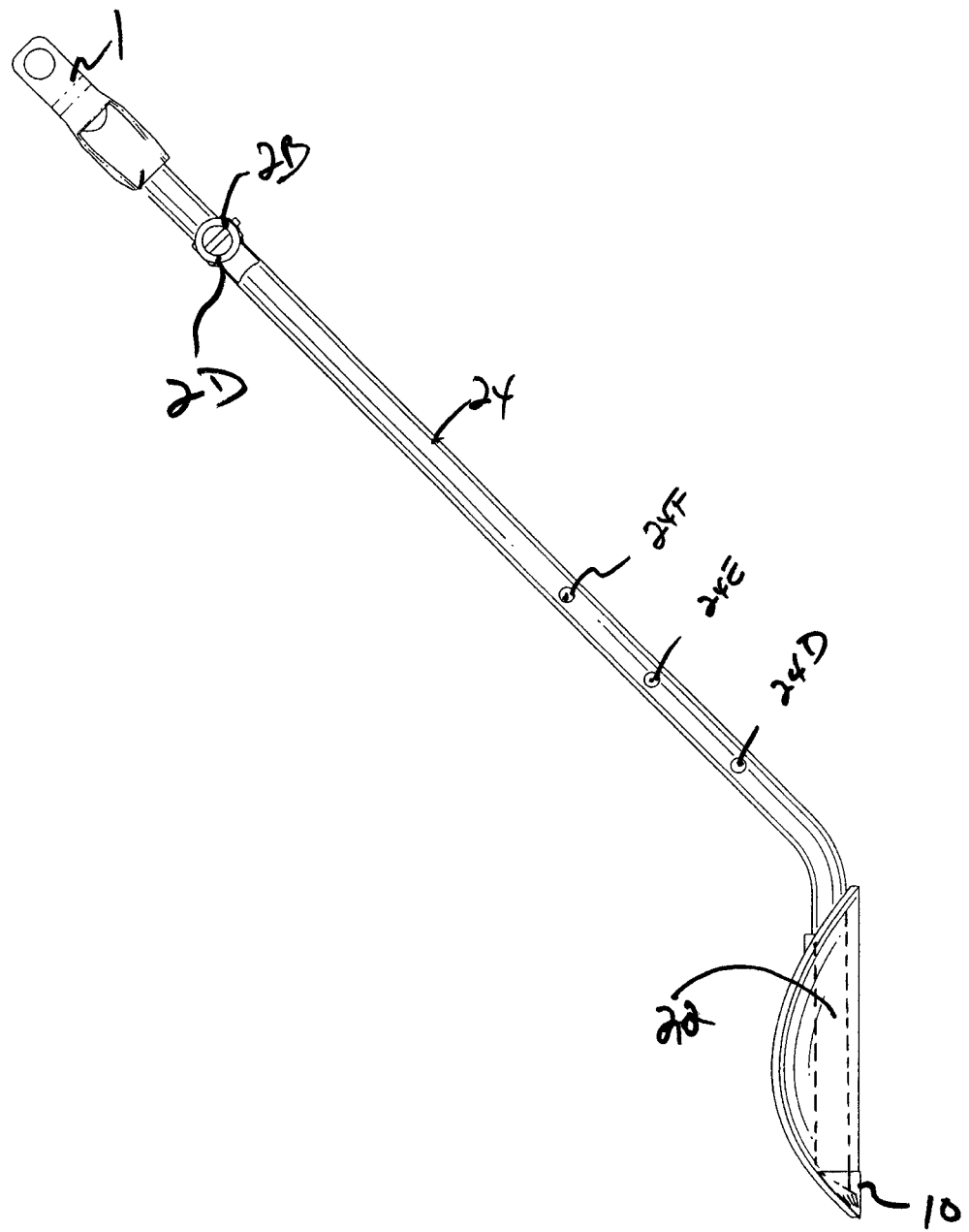
FIG. 4 is a right side view of a snow removal tool according to the invention with the blade in a flat position.
Figure 5:
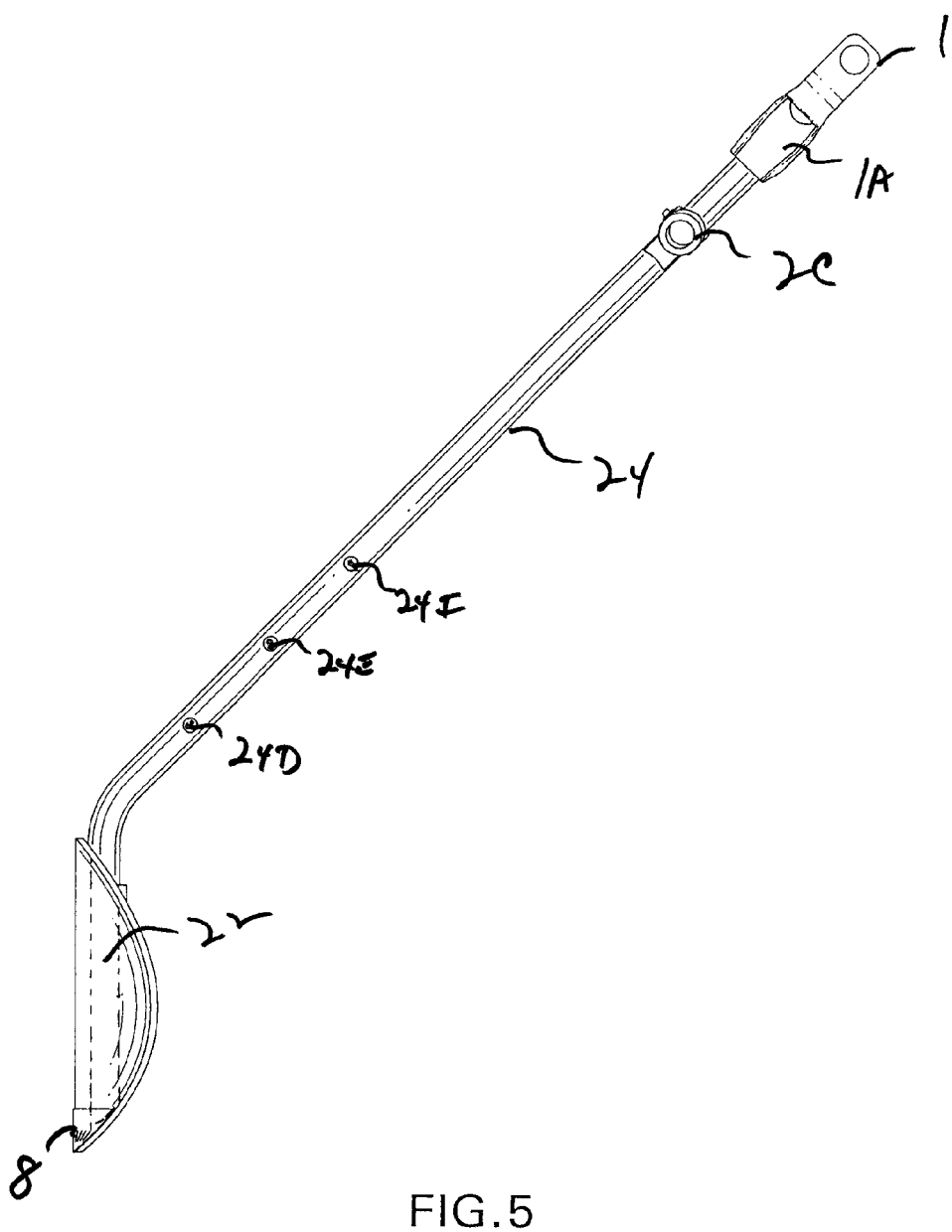
FIG. 5 is a left side view of a snow removal tool according to the invention with the blade in a flat position.

FIGS. 4 and 5 are side views of an embodiment of a snow removal tool according to the invention where the secondary shaft 22 is shown in phantom lines. The angle of the secondary shaft 22 to the main shaft 24 is about 110-150°, preferably about 125-135° which allows for the secondary shaft to be positioned against the ground surface by the operator at an angle that is substantially about 90° so that blades 8 and 10 are substantially in contact with the ground surface whether the blades are in the flat position of FIG. 1 or in the V-shaped configuration of FIG. 9. The positioning of the secondary shaft 22 in this manner allows the blades 4 and 6 to rotate in opposite directions about the secondary shaft 22 while the edges 8 and 10 remain substantially in contact with the ground surface. This allows for the efficient movement of snow or other materials without the need to use uncomfortable angles in the application of force to push the snow or other materials.

The main shaft 24 may be formed from an optional tubular telescoping element in order to accommodate use by operators of different stature by providing two or more different sized tubular elements at joint 25 that fit one within another. Holes 24A, 24 B and 24C are provided to accommodate spring loaded locking push buttons 24D, 24E and 24F that will securely hold main shaft 24 to the telescoping element in a rigid manner. Broken line 27 shows the concealed end of the main shaft 24 when it is positioned inside of the secondary shaft 22 of the snow shovel at joint 28A.

Figure 6:
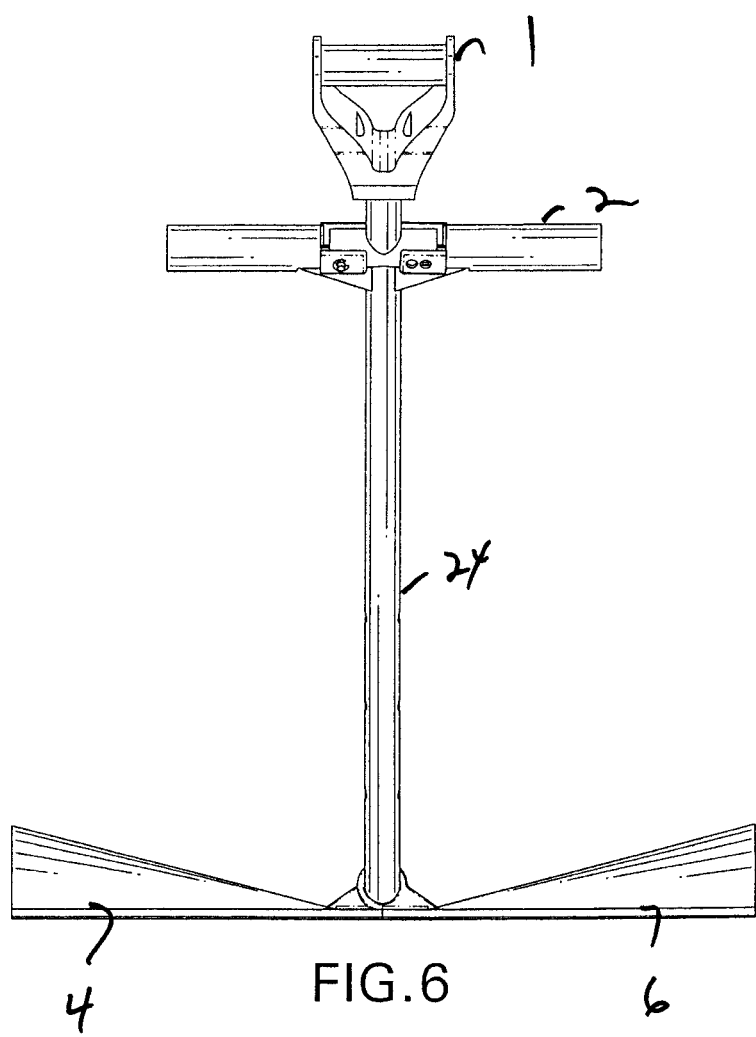
FIG. 6 is a top view of a snow removal tool according to the invention with the blade in a flat position.
Figure 7:
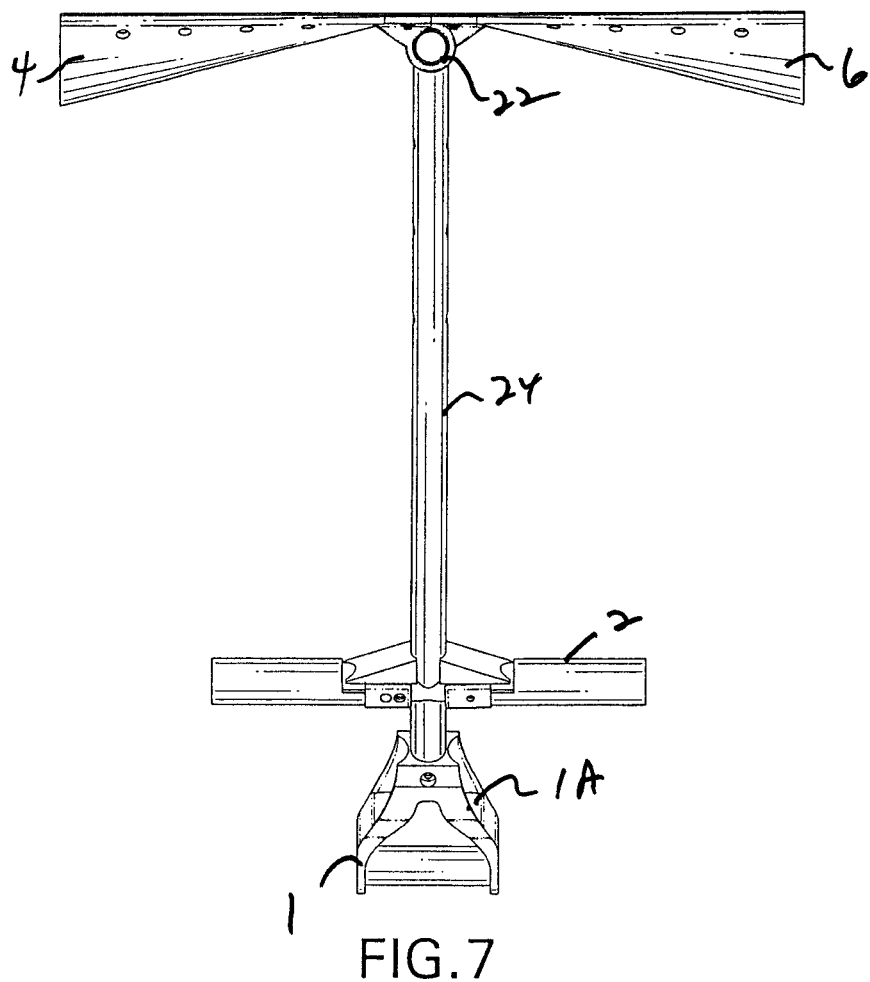
FIG. 7 is a bottom view of a snow removal tool according to the invention with the blade in a flat position.

FIG. 8 shows the positioning of holes 23A, 24A, 25A and 26A on rings 23B, 24B, 25 B, and 26B that encircle the secondary shaft. Blade 6 is connected to rings 23B and 25B while blade 4 is connected to rings 24B and 25B. The rings are sized so that blades 4 and 6 are securely held on secondary shaft 24 and may be rotated from the fat blade position to a V-shaped position without the application of undue force. Generally is to desired to provide a fit that will allow movement of the blades to be done with a force of 5 to 10 ft. lbs with conventional lubricants. The holes 23A, 24A, 25A and 26A are positioned to engage locking push buttons that can be depressed to allow for the movement of the rings to another position where additional holes are provided to lock the blades in various positions so that the blades will form various V-shaped configurations. Multiple locking push buttons may be positioned on shaft 22 to allow for the setting of the blades at an angle of 180° relative to one another as shown in FIG. 6 or in the V-shaped position which may be varied so that multiple angles such as 120°, 90° or 60° may be selected depending on the type of snow that is to be removed. Generally, heavy snow will be more easily moved when the V-shaped angle that is measured at the back of the snow shovel, is set at an acute angle, i.e. less than 90° or even at about 60°. The embodiment of FIG. 8 has two rings on each blade but if a more robust construction is required, additional rings can be added.

The blades 4 and 6 are preferably made with rings that are molded as a one piece construction to the separate blades 4 and 6. The preferred material for the blades is a high impact plastic such as polypropylene or polyethylene. Holes 30-37 are provided near the lower edges of blades 4 and 6 to accommodate fasteners such as bolts or Phillips screws for removably attaching edges 8 and 10 which can be provided as replaceable elements in metal, such as steel, aluminum etc. or plastic. If screws are provided, complimentary threaded holes may be provided in the blades.

Figure 10:
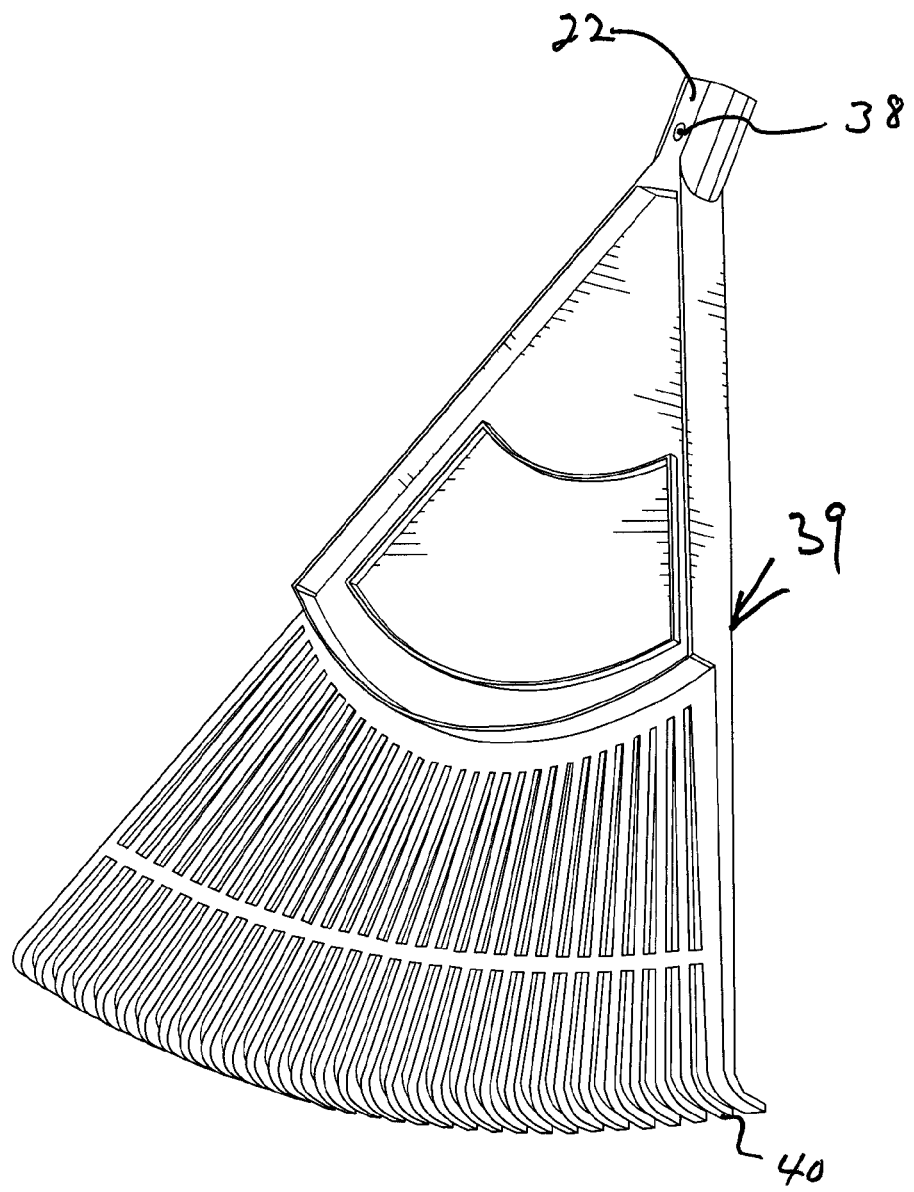
FIG. 10 is a front perspective view of a rake head according to the invention.

FIG. 10 discloses a rake 39 that is adapted for moving landscaping debris such as leaves and other debris associated with a domestic landscaping design. The shaft 22 shows spring loaded push button 38 on a top surface of shaft 22 but this spring loaded push button may be positioned on the side as shown on the embodiment of FIG. 1. The tines 40 and the other elements of rake 39 are typical of rakes used for moving landscaping debris.

Numerous modifications and variations of the present invention are possible in light of the above teachings. It is therefore understood that within the scope of the appended claims the invention may be practiced other than as specifically described herein.

The invention claimed is:

1. A tool comprising a main shaft on which a detachably mounted operating element may be positioned where said main shaft has a first end for attachment of a hand gripping means wherein said hand gripping means has a straight main shaft extending from said hand gripping means to a secondary shaft where said main shaft is angled to a secondary shaft having a first end and a second end wherein the angle between the straight main shaft and the secondary shaft is about 110-150° so that when a person grips said hand gripping means the secondary shaft forms an angle with a ground surface that is substantially a right angle wherein the said detachably mounted operating element is a snow plow blade and said secondary shaft is adapted to mount a two piece blade, where each blade has outer edges, inner edges and lower edges, and said two piece blade is articulated on the secondary shaft with moveable attachment means to form either a flat blade for pushing snow or a V-shaped blade for pushing through snow, where in either configuration, the lower edges of said snow plow blade are substantially completely in contact with the ground surface wherein the outer edges of each of the blades has a curved surface and the inner edges are articulated on said secondary shaft and the inner edge of each blade has a flat surface.

2. The tool as defined in claim 1 wherein said hand gripping means comprise either a closed handle with a gripping surface.

3. The tool as defined in claim 1 wherein the moveable attachment means are rings attached to each blade for attaching each blade to the secondary shaft.

4. The tool as defined in claim 1 wherein replaceable edges are provided on said lower edges.

5. The tool as defined in claim 1 wherein a T-shaped hand gripping means is provided which is foldable.

6. The tool as defined in claim 1 wherein each blade is rotatable in opposite directions around the secondary shaft.

7. The tool as defined in claim 3 wherein each blade is removably attached to the rings.

8. The tool as defined in claim 5 wherein said T-shaped hand gripping means with two gripping surfaces.

* * * * *